US008250055B2

(12) United States Patent
Ditto et al.

(10) Patent No.: US 8,250,055 B2
(45) Date of Patent: Aug. 21, 2012

(54) NON-LINEAR DYNAMICAL SEARCH ENGINE

(75) Inventors: William L. Ditto, Gainesville, FL (US); Sudeshna Sinha, Velachery (IN); Abraham Miliotis, Gainesville, FL (US)

(73) Assignees: University of Florida Research Foundation, Inc., Gainesville, FL (US); Control Dynamics, Inc., Bellevue, WA (US)

( * ) Notice: Subject to any disclaimer, the term of this patent is extended or adjusted under 35 U.S.C. 154(b) by 413 days.

(21) Appl. No.: 12/517,959

(22) PCT Filed: Dec. 5, 2007

(86) PCT No.: PCT/US2007/086499
§ 371 (c)(1), (2), (4) Date: Jun. 5, 2009

(87) PCT Pub. No.: WO2008/140600
PCT Pub. Date: Nov. 20, 2008

(65) Prior Publication Data
US 2010/0318506 A1    Dec. 16, 2010

Related U.S. Application Data

(63) Continuation-in-part of application No. 11/304,125, filed on Dec. 15, 2005, which is a continuation of application No. 10/680,271, filed on Oct. 7, 2003.

(60) Provisional application No. 60/868,622, filed on Dec. 5, 2006.

(51) Int. Cl.
*G06F 9/455* (2006.01)
(52) U.S. Cl. .......... 707/706; 716/132; 370/360; 370/392
(58) Field of Classification Search ................ 716/132
See application file for complete search history.

(56) References Cited

U.S. PATENT DOCUMENTS

| 3,473,160 | A |  | 10/1969 | Wahlstrom |
| 5,260,610 | A |  | 11/1993 | Pedersen et al. |
| 5,291,555 | A |  | 3/1994 | Cuomo et al. |
| 5,546,571 | A | * | 8/1996 | Shan et al. ............ 1/1 |
| 5,745,655 | A |  | 4/1998 | Chung et al. |
| 5,809,009 | A |  | 9/1998 | Matsuoka et al. |
| RE35,977 | E |  | 12/1998 | Cliff et al. |
| 6,025,735 | A |  | 2/2000 | Gardner et al. |
| 6,732,709 | B1 |  | 5/2004 | Havran et al. |
| 6,810,037 | B1 | * | 10/2004 | Kalapathy et al. ........... 370/392 |
| 6,876,232 | B2 |  | 4/2005 | Yoo |
| 7,068,069 | B2 |  | 6/2006 | Fujita |

(Continued)

OTHER PUBLICATIONS

Miliotis, et al., "Exploiting Nonlinear Dynamics to Search for the Existence of Matches in a Database," Circuits and Systems, 2006, APCCAS 2006, IEEE Asia Pacific Conference on Circuits and Systems, Singapore, Presented on Dec. 4, 2006.

(Continued)

*Primary Examiner* — Vuthe Siek
*Assistant Examiner* — Mohammed Alam
(74) *Attorney, Agent, or Firm* — Fleit Gibbons Gutman Bongini & Bianco, PL; Jon A. Gibbons

(57) ABSTRACT

A dynamical search engine for searching a database is also provided. The dynamical search engine includes an array of nonlinear dynamical elements. The nonlinear dynamical element information items in a manner that confines the state of each element on a fixed point and uniquely encodes the information items. The dynamical search engine also includes a controller for controlling electrical signals supplied to elements of the array in a predetermined sequence. One supplied signal increases a state value of each element of the array by a quantity defining a search key that corresponds to a searched-for information item. A subsequently supplied signal updates the state value of each element of the array by performing a nonlinear folding of each state value based on a predetermined pivot.

14 Claims, 8 Drawing Sheets

U.S. PATENT DOCUMENTS

2003/0204513 A1* 10/2003 Bumbulis ..................... 707/100
2004/0036636 A1   2/2004 Mai et al.
2006/0091905 A1   5/2006 Ditto et al.

OTHER PUBLICATIONS

Written Opinion & International Search Report dated Jan. 7, 2009 based on PCT/US2007/086499.

Murali et al., "Realization of the fundamental NOR gate using a chaotic circuit," Physical Review 68:1-5, 2003.

Murali et al., "Implementation of NOR gate by a chaotic chua's circuit," Unpublished.

Munakata et al., "Chaos Computing: Implementing of Fundamental Logical Gates by Chaotic Elements," IEEE Transactions on Circuits and Systems-I: Fundamental Theory and Applications 49: 1629-1633, 2002.

Murali et al., "Experimental Chaos Computing," Submitted to IEEEE Trans. in Circuits and Systems, in 2003.

* cited by examiner

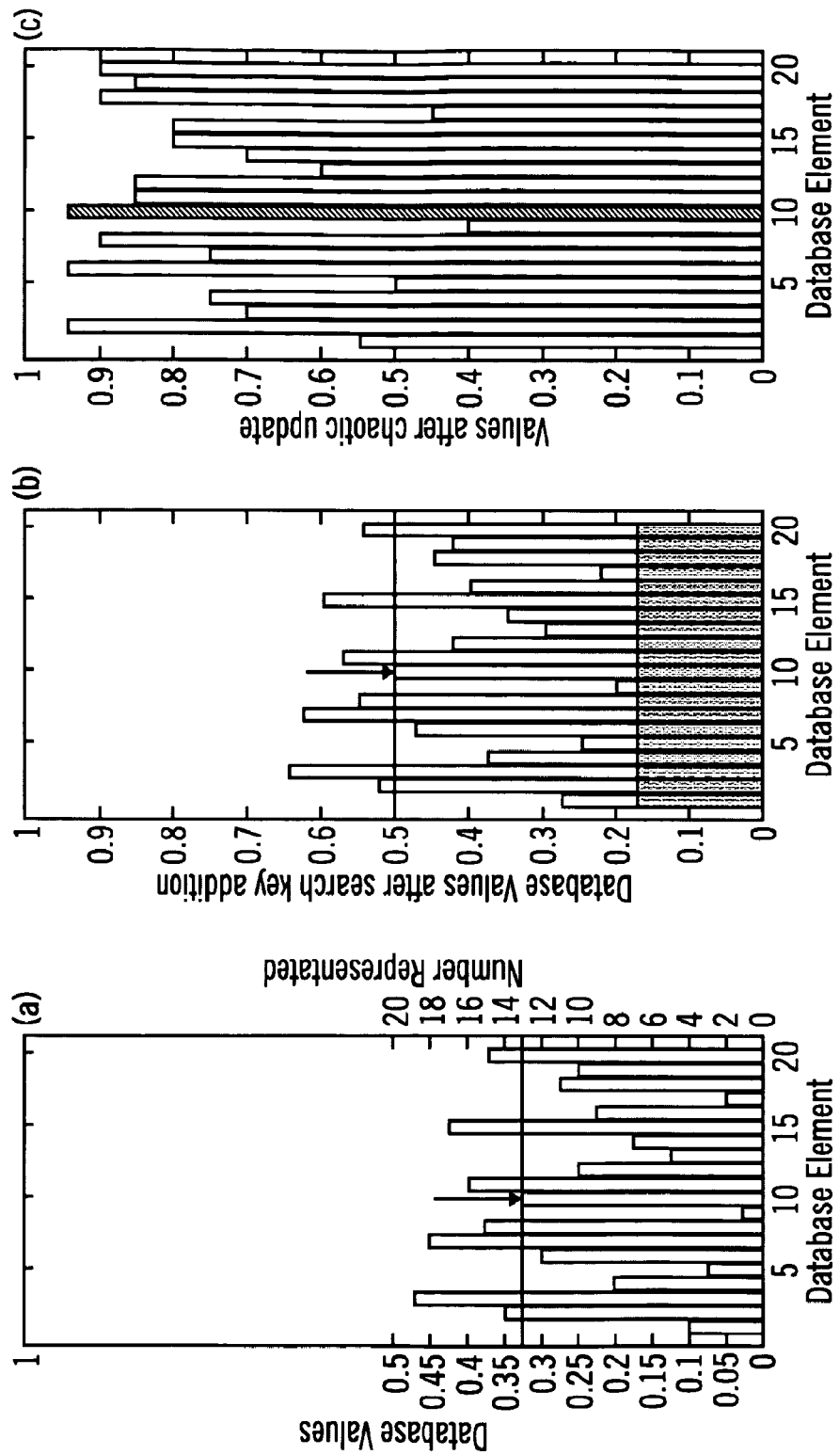

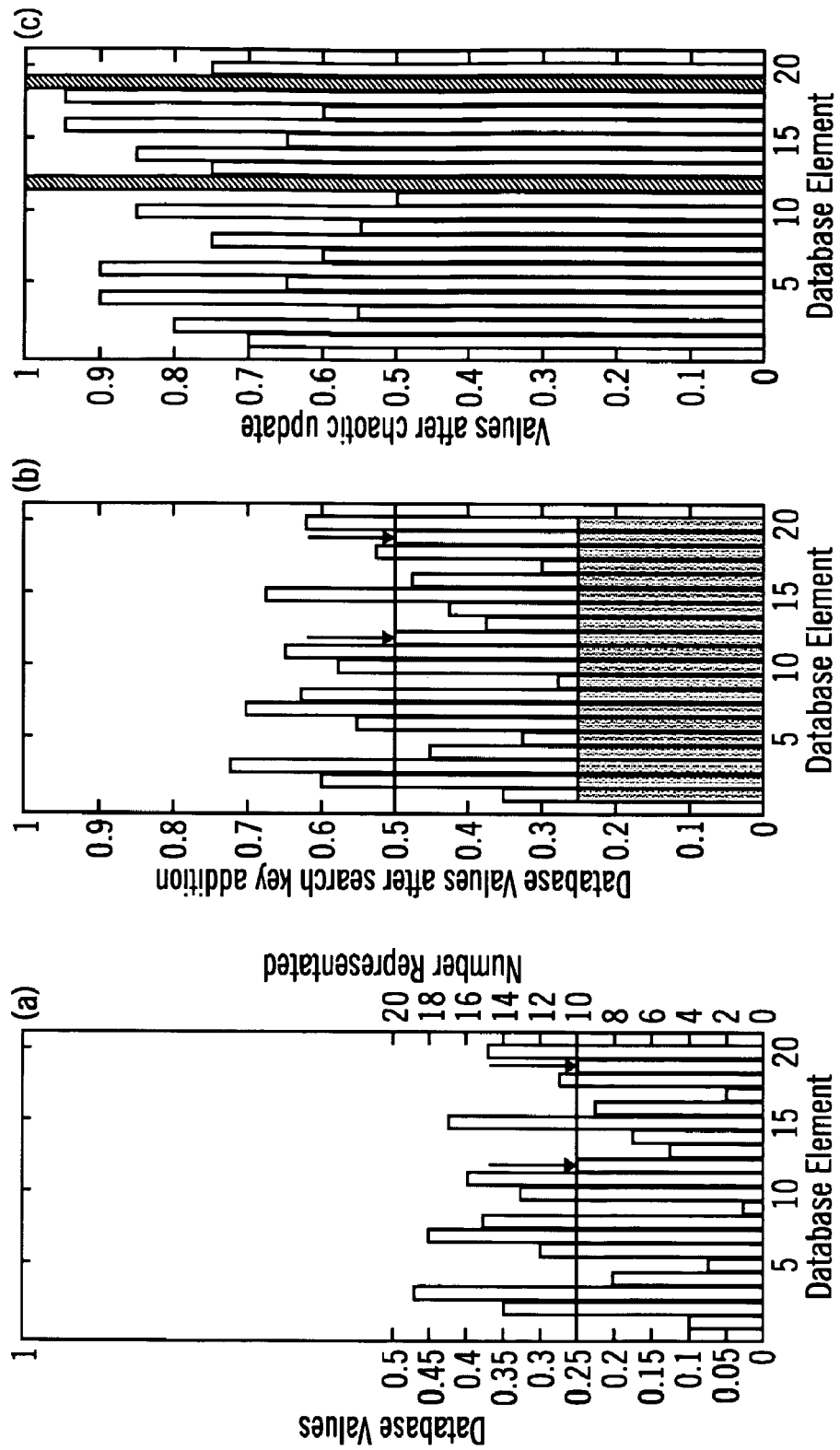

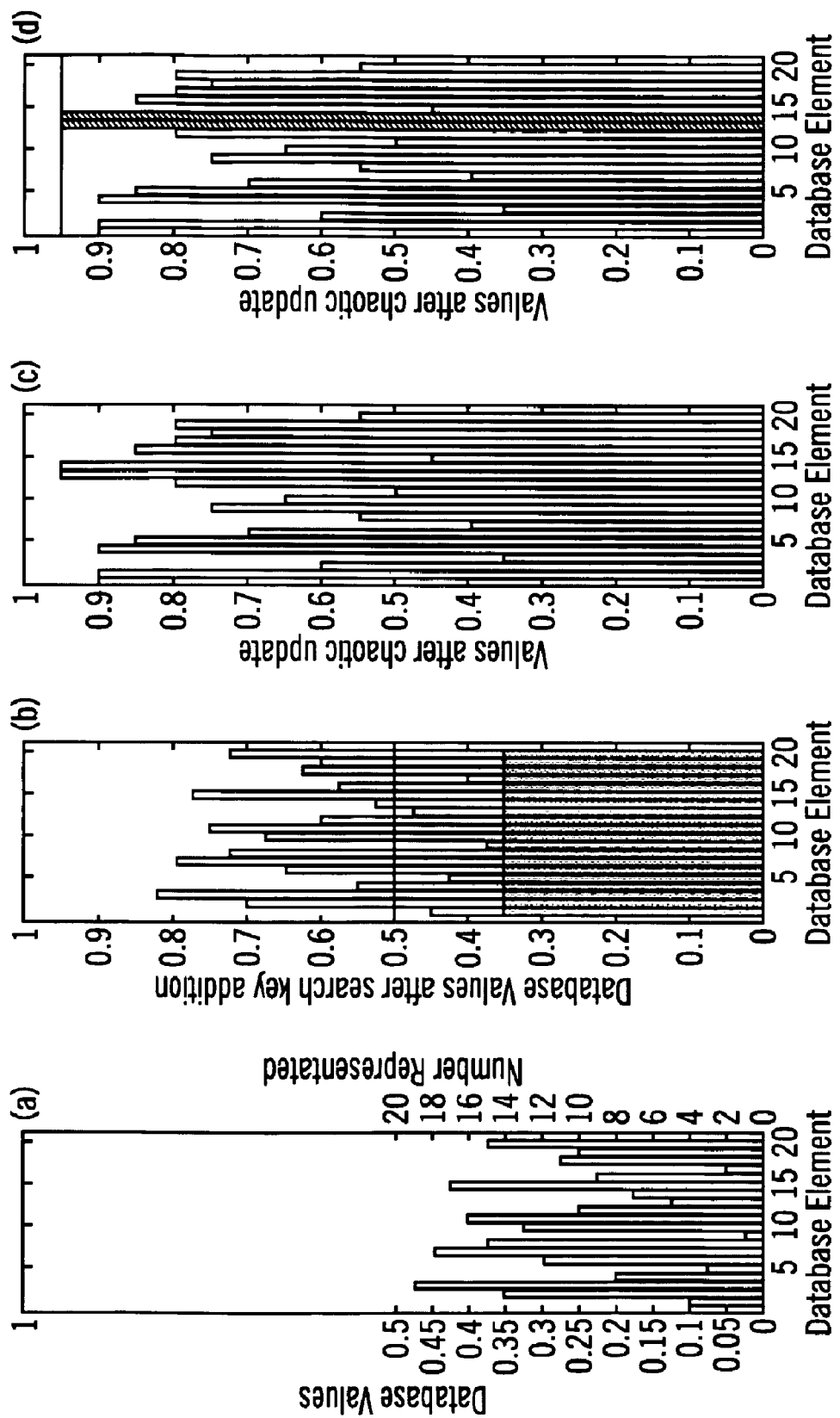

NON-LINEAR DYNAMICAL SEARCH ENGINE

CROSS REFERENCE TO RELATED APPLICATIONS

This application is a continuation of and, accordingly, claims the benefit of U.S. Provisional Patent Application No. 60/868,622, filed on Dec. 5, 2006 which is a continuation-in-part of and, accordingly, claims the benefit of U.S. patent application Ser. No. 11/304,125, filed in the U.S. Patent and Trademark Office on Dec. 15, 2005, and which is a continuation of U.S. patent application Ser. No. 10/680,271, filed in the U.S. Patent and Trademark Office on Oct. 7, 2003, now issued as U.S. Pat. No. 7,096,437 on Aug. 22, 2006, each of which are incorporated herein in its entirety.

STATEMENT REGARDING FEDERALLY SPONSORED RESEARCH OR DEVELOPMENT

The U.S. government may have certain rights to the present invention by virtue of a grant, grant no. N00014-00-1-0020, from the Office of Naval Research.

FIELD OF THE PRESENT INVENTION

The present invention is related to the field of information processing and, more particularly, database searching.

BACKGROUND OF THE PRESENT INVENTION

An essential ingredient of many information processing procedures is the searching of a database. Database searching typically entails a systematic examination of a collection of information elements, the database, stored in an electronic medium. The systematic examination is carried out electronically according to a predetermined criteria. Database searching is most often conducted to locate one or more items of data known to be contained in the database or, in the event of uncertainty, to determine whether certain data is in fact contained within the database.

Conventional database searching typically involves supplying an alphanumeric or character string to a processor and looking for a match between the supplied string and corresponding values stored in a memory. Further improvements in the speed and efficiency of conventional database searching is likely to be constrained, at least for the foreseeable future, by existing information processing technologies. As a result, other systems and procedures have been proposed for accomplishing the increasingly important task of database searching.

One alternative approach is the use of quantum computers. It is difficult, if not infeasible, however, to implement this approach using existing silicon-based processing devices. It follows that there is yet a need for alternative mechanisms for enhancing the efficacy and efficiency of database searching, preferably using existing technologies typified by CMOS circuitry. More particularly, there is a need for an effective and efficient mechanism for performing searches of databases comprising randomly organized and/or unsorted data elements.

SUMMARY OF THE PRESENT INVENTION

The present invention provides a nonlinear dynamical search engine. The nonlinear dynamical search engine, according to different embodiments, can determine whether an information item is contained within a database.

One embodiment of the present invention is a method of searching a database. The method can include encoding a plurality of information items on an array of nonlinear dynamical elements. The encoding can cause each element of the array to have a threshold value or control signal that confines the state of each element on a fixed point and uniquely encodes an information item on each element. Additionally, the method can include increasing a state value of each element of the array by a value defining a search key that corresponds to a searched-for information item. The method further can include updating the state value of each element of the array by performing a nonlinear folding of each state value of each element of the array on a predetermined pivot.

Another embodiment of the present invention is a system for searching a database. The system can include a database that comprises an array of nonlinear dynamical elements. A plurality of information items can be encoded on the array elements such that each element of the array has a threshold value that confines the state of each element on a fixed point and uniquely encodes an information item. The system can further include a controller for controlling electrical signals supplied to the database is a predetermined sequence. A signal can be supplied under the direction of the controller to increase a state value of each element of the array by a quantity defining a search key that corresponds to a searched-for information item. The controller can cause a subsequent signal to be supplied that updates the state value of each element of the array by performing a nonlinear folding of each state value based on a predetermined pivot.

BRIEF DESCRIPTION OF THE DRAWINGS

There are shown in the drawings, embodiments which are presently preferred. It is to be understood, however, that the present invention is not limited to the precise arrangements and instrumentalities shown.

FIGS. 4A-C are graphical representations of an exemplary database of information items comprising integers and corresponding results generated by performing a search of the database using a dynamical search engine, according to one embodiment of the present invention.

FIGS. 5A-C are graphical representations of an exemplary database of information items comprising integers and corresponding results generated in performing a search of the database using a dynamical search engine, according to one embodiment of the present invention.

FIGS. 6A-D are graphical representations of an exemplary database of information items comprising character strings and corresponding results generated by performing a search of the database using a dynamical search engine, according to another embodiment of the present invention.

DETAILED DESCRIPTION

The present invention, according to one embodiment, provides a dynamical search engine that utilizes one or more arrays of nonlinear dynamical elements. According to this embodiment, the nonlinear dynamical elements stably encode different forms of information, the information comprising one or more sets of information items. The totality of a set of information items encoded by the nonlinear elements defines an unsorted database, the size of which can be arbitrarily large. As described herein, the unsorted database, once so encoded, can be searched by the dynamical search engine's performing a single global operation on the array of nonlinear dynamical elements.

More particularly, the dynamical search engine can implement a scheme, also described herein, by which those elements containing an information item matching a searched-for item are identified by performing the single global operation. The dynamical search engine, in implementing the scheme described herein, also can indicate the number of nonlinear elements that encode the searched-for item. The number can be determined without the necessity of checking each nonlinear dynamical element individually. One aspect of the present invention, accordingly, is the construction and implementation of a single global operation that acts on the nonlinear dynamical elements that encode the database in a manner such that only the nonlinear dynamical elements encoding a searched-for information item exhibit a prescribed, readily measurable property.

The dynamical search engine, generally, is a nonlinear dynamical system; that is, the physical embodiments of the dynamical search engine exhibit nonlinear dynamical properties and, accordingly, are mathematically characterized in terms of a nonlinear dynamical system. The dynamical search engine is described herein primarily in terms of implementing a scheme based upon any unimodal map, such as a tent map, which is an iterated function forming discrete-time dynamical system that maps a point on the real line to another point. The mathematical properties of unimodal maps and tent maps are well known, and it serves here merely as an example to clearly illustrate the more general nonlinear dynamical properties of dynamical search engine according to the present invention. It will be apparent from the description herein, however, that the scheme based upon a tent map is merely one of the different schemes that can be implemented by the dynamical search engine. In general, the dynamical search engine can implement any scheme that exhibits the properties of a nonlinear dynamical system.

Figure 1:
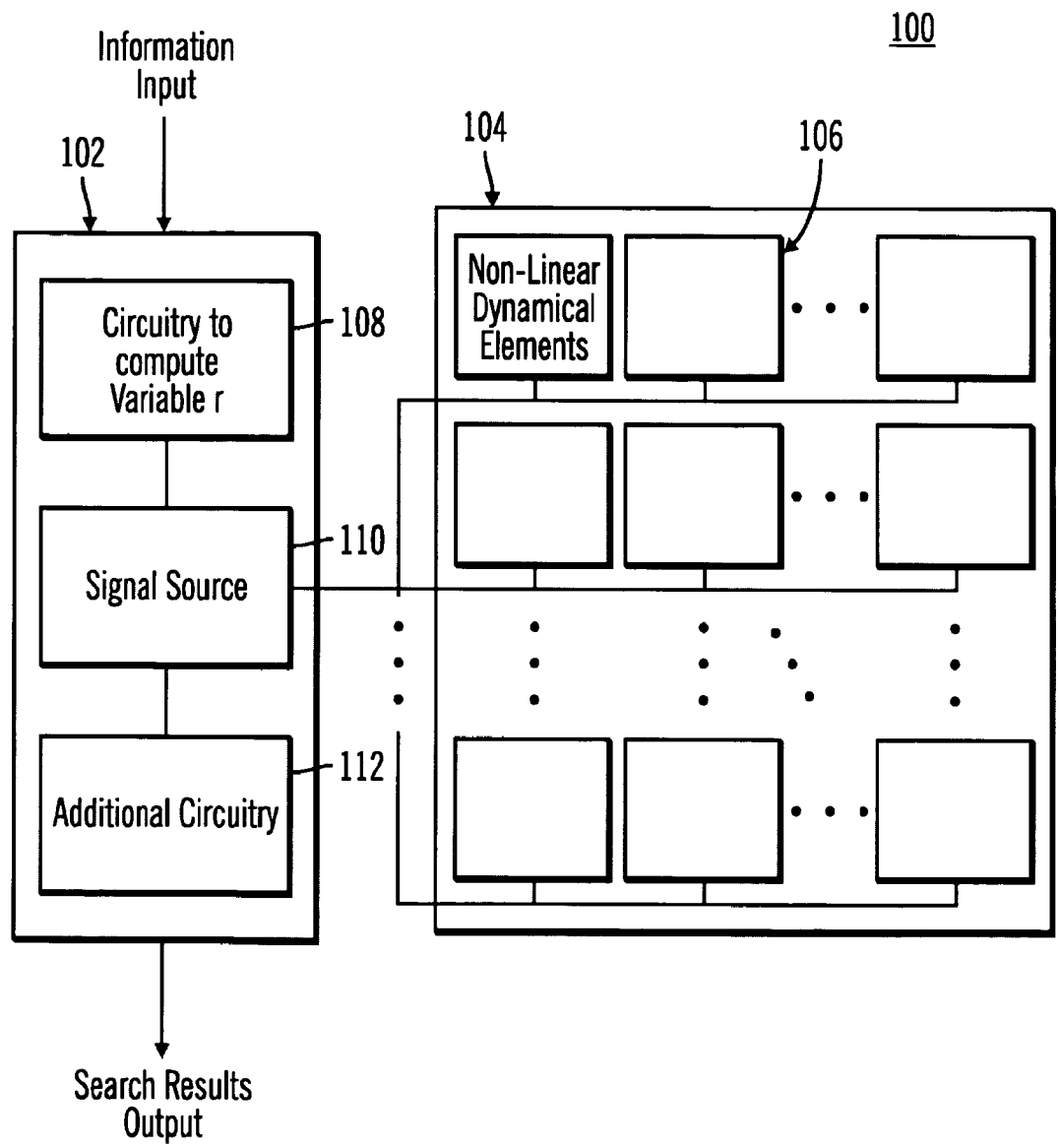
FIG. 1 is a schematic diagram of a dynamical search engine for performing dynamical database searches, according to one embodiment of the present invention.

FIG. 1 is a schematic diagram a dynamical search engine 100 for performing nonlinear dynamical searches of a database, according to one embodiment of the present invention. The dynamical search engine 100 illustratively comprises a controller 102 in communication with an array 104 comprising a plurality of N nonlinear dynamical elements 106. The nonlinear dynamical elements 106, according to one embodiment, can each comprise a chaotic logic gate having a circuit architecture as described in U.S. patent application Ser. No. 11/304,125, filed in the U.S. Patent and Trademark Office on Dec. 15, 2005, and U.S. patent application Ser. No. 10/680,271, filed in the U.S. Patent and Trademark Office on Oct. 7, 2003, and now issued as U.S. Pat. No. 7,096,437, each of these references are hereby incorporated by reference in their entirety. Further this patent application incorporates by reference in its entirety the two versions of the same paper: i) Exploiting Nonlinear Dynamics to Search for the Existence of Matches in a Database," A. Miliotis, S. Sinha and W. L. Ditto, Proceedings of the APCCAS 2006 IEEE Asia Pacific Conference on Circuits and Systems, Singapore, Presented on Dec. $7^{th}$, 2006; and ii) "Exploiting Nonlinear Dynamics to Store and Process Information," Abraham Miliotis, Sudeshna Sinha and William L. Ditto, Int. J. of Bifurcation and Chaos, (to appear 2008), each of which is incorporated by reference in its entirety.

The nonlinear dynamical elements 106 of the array 104 stably encode a plurality of information items, creating an unsorted database. The plurality of information items is encoded on the nonlinear dynamical elements 106 such that each of the nonlinear dynamical elements has a threshold value that confines the state of each element on a fixed point and uniquely encodes an information item.

The controller 102 controls electrical signals that are supplied to the nonlinear dynamical elements 106 of the array 104 in a predetermined sequence. As used herein the word controller and/or threshold and/or threshold value can be implemented as being compatible with either an analog or digital signal. As described below, an applied electrical signal can increase a state value of each nonlinear dynamical element 106 of the array 104 by a quantity defining a search key that corresponds to a searched-for information item. A subsequently applied electrical signal can update the state value of each nonlinear dynamical element 106 of the array 104 by performing a nonlinear folding of each state value based on a predetermined pivot, as also described below.

Operatively, the dynamical search engine 100 performs a search of the database by globally increasing the state value of each of the nonlinear dynamical elements 106 by the specific amount of the search key, the controller 102 controlling the amount and/or timing of one or more electrical signals, such as voltage supplied by a voltage source (not explicitly shown) or current supplied by a current source (also not shown explicitly), which change the state values of the nonlinear dynamical elements 106. The amount by which the state value of each of the nonlinear dynamical elements 106 is increased with an initially applied signal is an amount that causes only an element having a searched-for item to reach a predetermined maximum state value on a subsequent update; that is, when the state value of each of the nonlinear dynamical elements is increased again by a specific amount by the controller 102, only those elements, if any, that are encoded with the searched-for item reach the maximum state value.

Without loss of generality, the operative aspects of the dynamical search engine 100 can be described in the context of a database in which the information items are positive integers contained within the range $[1, I_{max}]$. The encoding of the nonlinear dynamical elements 106 of the array 104, illustratively of size N, results in an unsorted database that is searchable by the dynamical search engine 100. According to the present invention, the corresponding collection of information within the array 104 of nonlinear dynamical elements 106 is encoded such that the configuration of elements is stable and has a unique one-to-one correspondence with the information stored therein.

The information is encoded using a threshold mechanism on the nonlinear elements in the array More particularly, the encoding proceeds as follows: whenever the value of a prescribed state variable of the dynamical element exceeds a prescribed critical threshold $x^*$ (i.e. when $x > x^*$) the variable x is re-set to $x^*$. Thresholding according to the encoding scheme actually works as a control mechanism, and a wide range of stable regular behaviors are obtained from chaotic dynamical systems under this thresholding. A wide window of threshold values typically can be used where the system is confined on fixed points, namely that the state of each of the nonlinear dynamical elements 106 under such thresholding is stable at x*. Such a window is illustratively used in this described embodiment to encode a stable database.

Database Encoding

A searchable database, as already described, is created by the encoding of the nonlinear dynamical elements 106 of the array 104. The encoding can be based on various schemes that exhibit the properties of a nonlinear dynamical system. One exemplary scheme is based on a unimodal map, as noted above. An encoding scheme based on one example of a unimodal map, i.e. a tent map, is described immediately below, the encoding scheme being illustrative of the more general aspects of the present invention described herein.

Thus, according to one embodiment of the present invention, the nonlinear elements 106 illustratively evolve according to a chaotic tent map, defined on the interval [0, 1]: $x_{n+1} = 2 \min(x_n, 1-x_n)$. Each element has a threshold value that confines it on a fixed point and uniquely encodes the information item it holds. With respect to the stated map, thresholds ranging from 0 to 2/3 yield fixed points with the variable x held at x*. This can be seen from the fact $f(x^*)>x^*$ for all x* in the interval (0, 2/3), implying that, on iteration, a state at x* will always exceed x*, and thus be reset to x*.

According to the encoding scheme of this embodiment, the thresholds are chosen from the interval (0, ½). A variable, r, is defined as follows:

$$r = \frac{1}{2} \cdot \frac{1}{(I_{max}+1)}. \tag{1}$$

The value or quantity, r, determines the resolution. The value or quantity, r, further yields a lookup map from the encoded number z to the threshold $x^*_z$. The resulting map connects the positive integers, z, within the range $[1, I_{max}]$, to the irrational numbers, $x^*_z$, of the interval (0, ½) according to the following relationship:

$$x^*_z = z \cdot r, \tag{2}$$

such that the thresholds are contained in the interval [r, ½−r]. It can be seen from Eq. (1), that if the threshold setting has more resolution, namely a smaller r, then a larger range of values can be encoded with each element.

Note, however, that precision is not a restriction of the dynamical search engine 100. Different representations of data can be chosen in order to suit a given precision of thresholding. Thus, the database consists of an array of tent maps, with their thresholds set such that they are in a stable fixed state. The scheme thus reliably and robustly encodes each item of information in the database. The exemplary database is unsorted and can be arbitrarily large, as noted above, depending on the size of the array 104. Further it need not contain all possible items, namely some numbers in the allowed range $[1, I_{max}]$ may not be present, while others may occur frequently.

The controller 102 illustratively includes processing circuitry 108 comprising dedicated hardwired circuitry and/or logic-based circuitry for processing machine-readable code that computes the variable r according to equation (1), above, and then determines the corresponding thresholds, $x^*_z$, for each of the various positive integers, $z \in [1, I_{max}]$, based on the computed r according to equation (2), above. The positive integers, $z \in [1, I_{max}]$, user input can be supplied to the controller 102 via a keyboard (not shown) or one of various other digital or analog electronic input devices.

The controller 102 further illustratively includes a signal source 110, such as a voltage or current source, that applies electrical signals to each of the nonlinear dynamical elements 106 of the array 104 in order to encode the elements in response to the user-supplied input. Specifically, the electrical signals supplied by the signal source 110 are such that each nonlinear dynamical element possesses a threshold $x^*_z$ that corresponds to the z value that it encodes.

The controller 102 illustratively includes additional circuitry 112 for processing the search results generated by the dynamical search engine 100. The results can be conveyed to a display screen (not shown) or other electronic transducer for converting electrical signals into a form that can be perceived directly by the user.

Database Searching

The search for a specific item is performed by globally increasing the state values of each nonlinear dynamical element 106 by an amount uniquely corresponding to the item searched for, namely by a search key $S_{key}^z$ value. The state values of the nonlinear dynamical elements 106 of the array 104 can be increased by applied electrical signals controlled by the controller 102, as already described. The search key, $S_{key}^z$, is defined by the following equation:

$$S_{key}^z = \frac{1}{2} - x^*_z = \frac{1}{2} - z \cdot r, \tag{3}$$

where z is the number for which the database is searched. Specifically, $S_{key}^z$ is added to each of the nonlinear dynamical elements 106. The result is a shift of the interval that the database elements can span, from [r, ½−r] to [r+$S_{key}^z$, ½−r+$S_{key}^z$], where $S_{key}^z$ represents the globally applied shift.

It should be further noted that the information item being searched for, is coded in a manner complimentary to the encoding of the information items in the database (much like a key that fits a particular lock), namely $S_{key}^z + x^*_z$ adds up to ½. This guarantees that only an item matching the one being searched for will have its state shifted to ½. The value of ½ is notable in that it is the only state value that, on the subsequent update, will reach the value of 1.0, which is the maximum state value for the dynamical search engine 100. Thus only the matching items will reach 1.0 after the search operation is performed.

A unique characteristic of the point ½ is that it acts as pivot point for the folding that occurs on the interval [r+$S_{key}$, ½−r+$S_{key}$] upon the next update. This provides a global monitoring operation for confirmation of the existence of any specified information item. Moreover, by relaxing the value of the global confirmation level by a prescribed tolerance to a value less than 1.0, the existence within the database of numbers that are close to the number being searched for can be determined The detection of the state value of a nonlinear dynamical element 106 belonging to the array 104 can be accomplished is different ways. According to one embodiment a threshold-response-triggered detector (not shown), triggered for example by the element taking on a state value 1.00, can be utilized with each element of the array 104.

Figure 2:
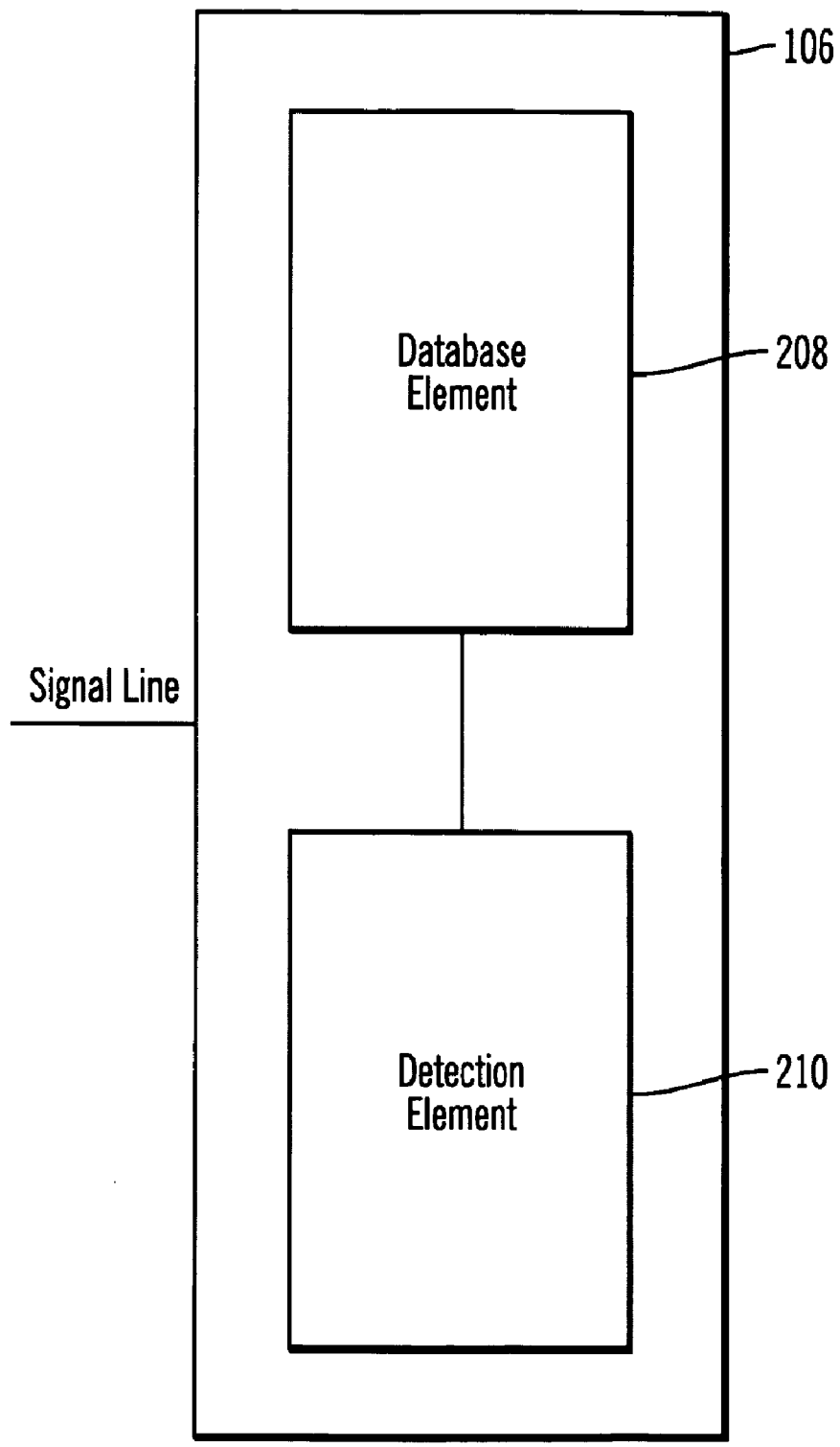
FIG. 2 is a schematic diagram of a nonlinear dynamical element for encoding information items, according to another embodiment of the present invention.

According to an alternative embodiment schematically illustrated in FIG. 2, however, each nonlinear dynamical element 106 of the array 104 comprises a database element 208, encoded according to the mechanism already described, and a separate detection element 210. According to this embodiment, the detection element 210 is threshold coupled to the database element 208, with the coupling activated only when the database element is within a predetermined threshold of 1.00; that is, 1.00±ϵ, where, for example, ϵ∈[0.01, 0.25]. Once activated, the detection element 210 sends a pulse, via a common lead, for example, that registers the search result by indicating the number of matches in the entire database. The response of the detection element 210, additionally or alternatively, can be configured to encode with a unique, one-to-one value, its location within the array 104. Such encoding permits the location of searched-for information items within the array 104 to be determined. Thus, this additional step provides for ready determination of location one the desired state is selected from a multitude of states and mapped to an extremal value. Such extremal values can then be set up for ready detection by a simple mechanism such as by the threshold-activated pulse generation.

Figure 3A:
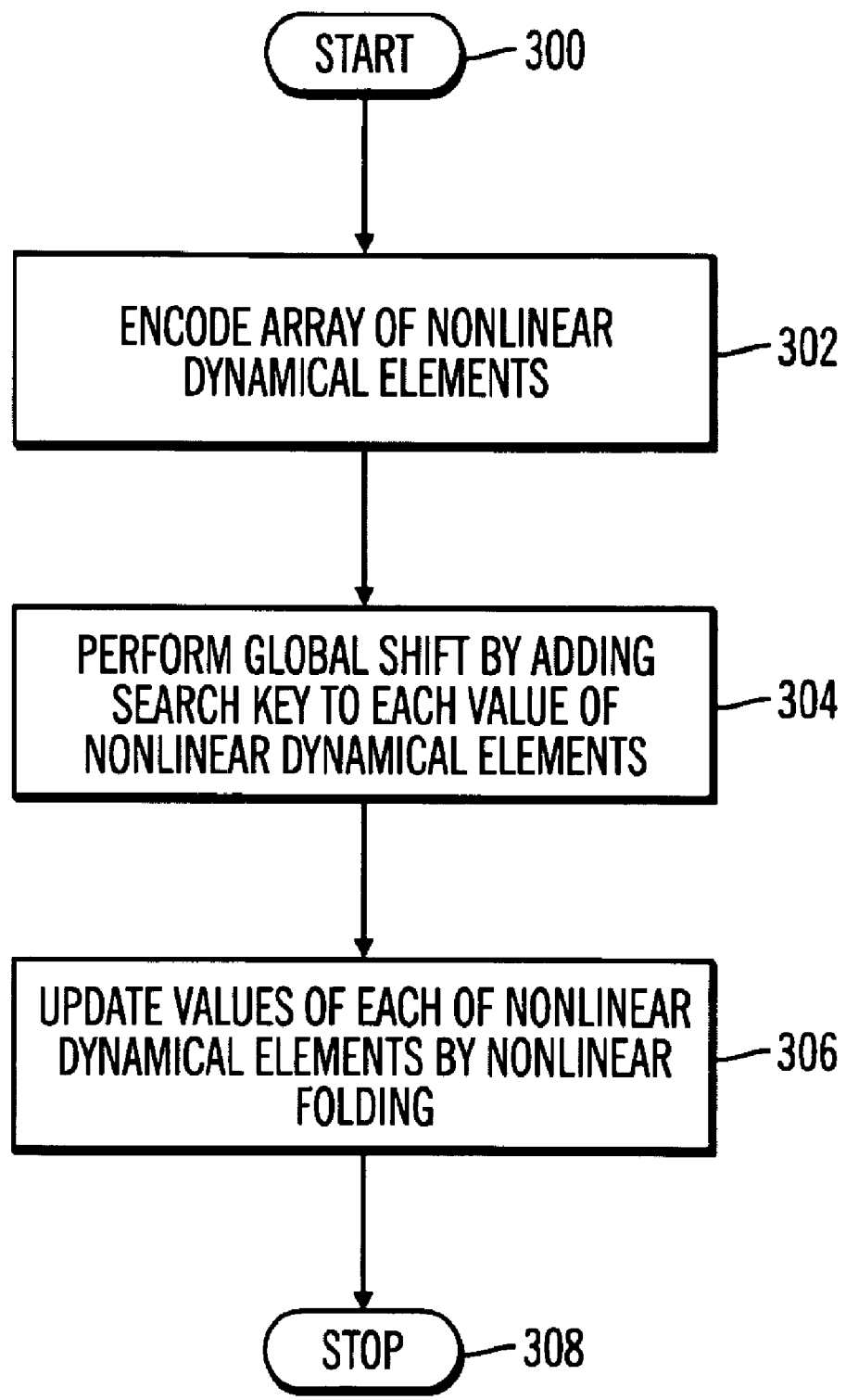
FIG. 3A provides a flowchart of the exemplary steps of a method 300 of searching a database and FIG. 3B is a corresponding schematic representation of the nonlinear dynamical search engine, according to yet another embodiment of the present invention.
Figure 3B:
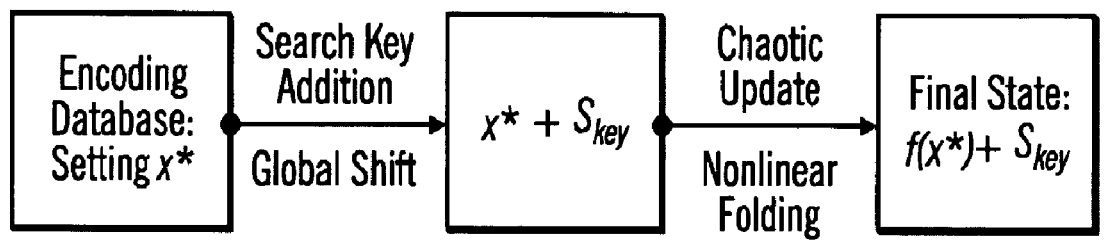

FIG. 3A provides a flowchart of the exemplary steps of a method 300 of searching a database and FIG. 3B is a corresponding schematic representation of the nonlinear dynamical search engine, according to yet another embodiment of the present invention. The method illustratively includes, at step 302 encoding a plurality of information items on an array of nonlinear dynamical elements. The encoding step 302 encodes each element of the array such that each has a threshold value that confines the state of each element on a fixed point and uniquely encodes an information item on each element. At step 304, the method 300 illustratively includes increasing a state value of each element of the array by a value defining a search key that corresponds to a searched-for information item. The method 300 further includes, at step 306, updating the state value of each element of the array by performing a nonlinear folding of each state value of each element of the array on a predetermined pivot.

The method optionally can further include determining whether the searched-for information item is encoded on at least one of the elements of the array by determining whether at least one of the elements has a maximum state value after the step of updating. The method illustratively concludes at step 308.

Representative Examples

The operative aspects of a dynamical search engine according to the present invention can be demonstrated using a database of 20 information items, each item randomly selected from a range of integers [1, 19]. According to the computation and determinations described above, r=0.025 and each number is encoded by a threshold value in the interval [0.025, 0.475]. The information items and their location in the database were chosen randomly. As graphically illustrated in FIGS. 4A and 5A, the integer 13 exists only once in the randomly generated database, while the integer 6 is absent from the database and the integer 10 is present twice.

The first example is of a search for the information item z=13. The search entails shifting the state of all the elements by $S_{key}^{z=13}=\frac{1}{2}-13 \cdot r=0.175$. As a result of the shift, the state values of the encoded nonlinear dynamical elements lie in the interval of [0.2, 0.65]. Significantly only the nonlinear dynamical element encoding the integer 13 has value of ½. An implication of this is that on the subsequent chaotic update, only the matched element will attain the value of 1.0. All nonlinear dynamical elements encoding information items comprising integers whose values are greater than or less than 13 have their state value folded back to a value less than 1.0.

Since the search operation only alters the states of the maps, the thresholds that defined the actual data stored in each map remain unaltered and can function as a mechanism to restore the original database. Once the database is restored one can perform another search. FIGS. 5A-C and 6A-D graphically illustrate searches for two other information items: the integers 10 and 6, respectively. In the first case, the integer 10 occurs twice and it is evident that both matching elements reach value of 1.0. In the case of a search for the integer 6, which does not exist in the randomly generated database, it is apparent that upon the initiation of the search no element will be on the pivot point of ½, and even though the folding of the state values in each of the maps will occur, no element will attain value of 1.0, as graphically illustrated in FIG. 6C.

The folding of the interval [r+$S_{key}$, ½−r+$S_{key}$] occurs such that the intervals on both sides of pivot point ½ fold onto each other. As graphically illustrated in FIG. 6C, where the search is for the integer 6, elements encoding the integers 5 and 7 are both mapped to a state value of 0.95. This overlap of "equidistant" information items from the searched-for item provides a mechanism to monitor, or search, for collections of items that are encoded by states in close proximity. This implies that if the value of 1.0 is reduced by a predetermined amount, it will enable the detection of inexact matches. The detection of the existence of items close to a desired searched for item is possible even when the target item does not exist in the database. FIG. 6D graphically illustrates the detection of two information items close the integer 6—the integers 5 and 7—by relaxing the value of 1.0 to 0.95.

Figure 7:
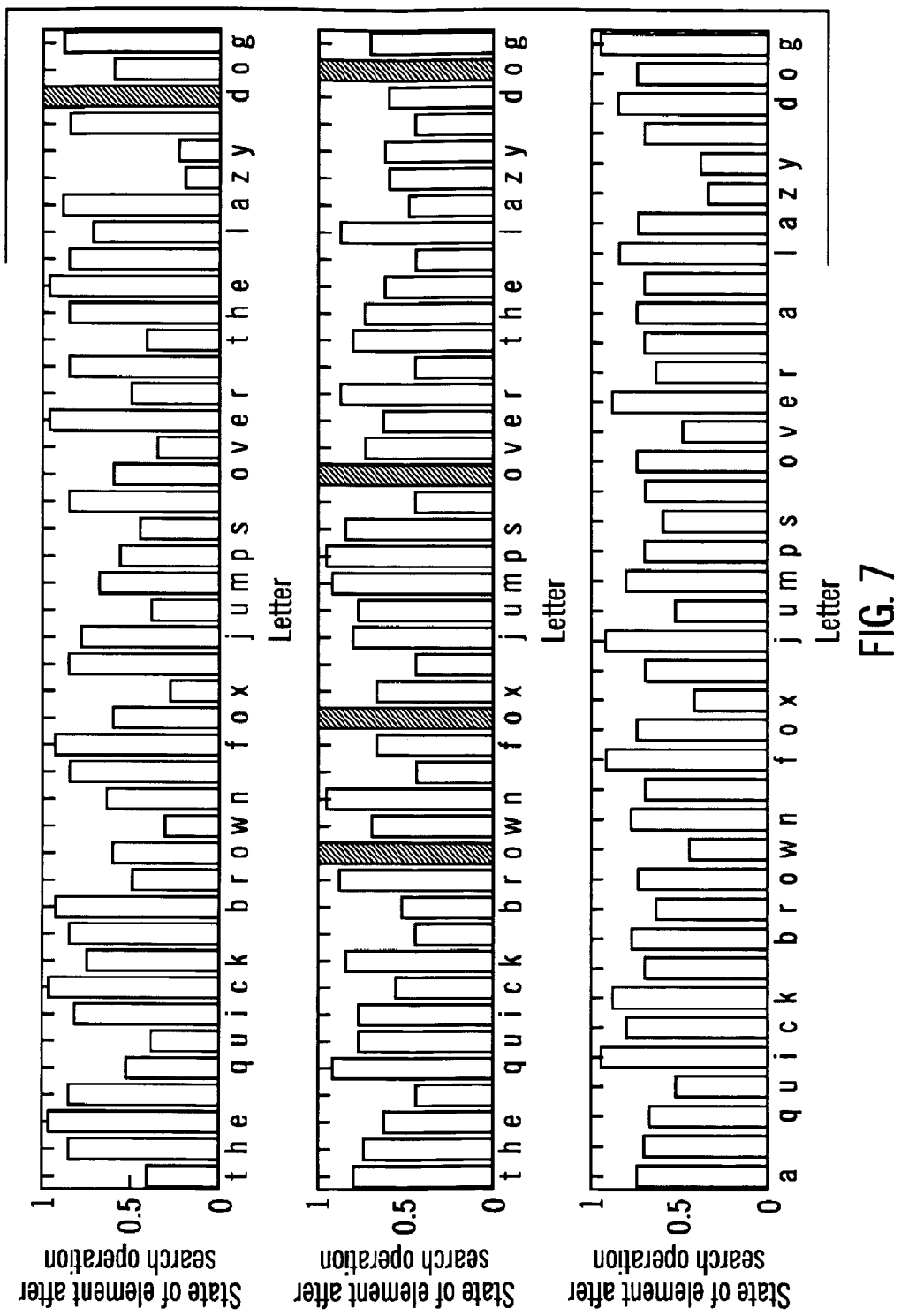
FIG. 7 is searching databases containing a pangram and an altered pangram for specific letters (Upper) Search for the letter "d" has been performed; (Middle) search for the letter "o" has been performed; and (Bottom) search for the letter "h" has been performed on the altered pangram database

FIG. 7 graphically illustrates another exemplary search according to the present invention in which letters of the English alphabet have been encoded according to invention based on the above-described scheme. Illustratively, a pangram comprising "the quick brown fox jumps over the lazy dog" is used as the information that is encoded, with each letter represented by a tent map with the appropriate threshold. A pangram comprising "a quick brown fox jumps over a lazy dog" does not include the letters "t", "h" and "e".

Once the databases are encoded, the following searches are illustratively performed: 1) the letter "d", which exists only once, as graphically illustrated in FIG. 7A; 2) the letter "o" which is present multiple times, as graphically illustrated in FIG. 7B; and 3) the letter "h" which is missing in the altered pangram, as graphically illustrated in FIG. 7C.

Thee method according to one embodiment of the present invention, as already described, utilizes the fact that a region of the tent map, [1/3, 2/3], is folded around its midpoint, ½, and then stretched and translated into the region [2/3, 1] after one iteration of the map. As a result, the point ½ is the sole point mapped onto 1.0, which is the maximum possible state value for the map. The search operation entails shifting the interval encoding the database by an amount that shifts the matching item(s) onto the pivot point ½. The subsequent dynamical update will then take only the matching item(s) to the value of 1.0.

As the description and representative examples demonstrate, one aspect of the present invention is the nonlinear evolution of the state values, which result in folding. The selection of the matched item can be entirely based on this feature. Chaos, or specifically the properties of a chaotic system, is not strictly necessary. It is evident though, that for unimodal maps higher nonlinearities allow larger operational ranges for the search operation, and also enhance the resolution in the encoding. For the tent map, specifically, it can be shown that the minimal nonlinearity necessary for the above-described search operation to work, the operation is performed in the chaotic region. Another specific feature of the tent map is that its piecewise linearity allows the encoding and search key operation to be straightforward.

A significant aspect of this scheme is that it employs a single simple global shift operation, and does not entail accessing each item separately at any stage. The scheme also uses a nonlinear folding to select out the matched item, and this nonlinear operation is a natural dynamical evolution of the elements. Accordingly, the search effort is considerably minimized as it utilizes the native processing power of nonlinear dynamical processors. This can be considered a natural application, at the machine level, in a computing machine consisting of chaotic modules. The scheme is also equally potent as a special-applications "search chip," which can be added on to conventional circuitry, and is especially useful in machines which are repeatedly employed for selection/search operations.

In terms of the timescales of the processor, the search operation requires one dynamical step, namely one unit of the processor's intrinsic update time. A salient principal point is the scope for parallelism that exists in the scheme embodied in the present invention. This is due to the selection process occurring through one global shift, which implies that there is no scale-up, at least in principle, with size N. Additionally, a search according to the present invention does not need a ordered set, further reducing operational time. This is notable, vis-à-vis the scale-up of operational times with size N in a conventional search algorithm. A conventional search typically will take O(log N) procedural steps. In addition, there is the time required for ordering, such as merge sort, which scales with N as O(N log N).

Regarding information storage capacity, it is notable that the present invention can employ a k-state encoding, where k can be very large in principle. This offers considerable gain in encoding capacity. As demonstrated by the representative example, above, the letters of the alphabet are encoded by one element each; binary coding would require much more hardware to do the same.

The scheme embodied in the present invention also offers the distinct advantage that the enabling technology for practical implementation need not be very different from conventional silicon devices. Namely, the physical design of a dynamical search chip can be realizable through conventional CMOS circuitry. Implemented at the machine level, this scheme can perform unsorted database searches efficiently.

Lastly, regarding the general breadth of the scheme embodied in the present invention, it should be noted that nonlinear systems are abundant in nature, and so alternative embodiments of the present invention encompass many different physical systems, ranging from fluids to electronics to optics. Physical realization of the scheme include nonlinear electronic circuits and optical devices, which have distributed degrees of freedom. Also systems, such as single electron tunnelling junctions, which are naturally piecewise linear maps, can be employed to make such search devices. These observations underscore the general scope of the present invention concept. In particular, it has been experimentally have implemented with a model of a resistively shunted Josephson junctions with current bias and rf drive. Accordingly, the present invention's general implementation of a nonlinear function for selection of a particular, or desired, state can find embodiment in many different physical contexts.

The present invention has been described primarily in terms of the dynamics of non-linear maps, specifically the tent-map, which are utilized to provide a search method according to the present invention. It is important to note that the actual computational overhead in this method can be made minimal in that the present invention takes advantage of the natural evolution and behavioral patterns of a nonlinear map to shift most processing steps to act as natural processes. Other applications of the present invention include utilization of high-dimensional systems to increase the data storing capabilities of a single element, information transfer once a search has been performed to other computational tasks, and localization of searched for items.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the present invention.

We claim:

1. A method of searching a database, the method comprising:
encoding a plurality of information items on an array of nonlinear dynamical elements such that each element of the array has a threshold value that confines a state of each element on a fixed point and uniquely encodes an information item on each element, wherein the nonlinear dynamical elements includes at least one logic gate for implementing logical expressions, each element of the array evolves according to a unimodal map of unimodal probability distribution, and the unimodal map is a tent map defined by an equation $x_{n+1}=2\min(x_n, 1-x_n)$, where each element of the array is denoted by x and n is a number of elements in the array, the logic gate comprising:
at least one input for receiving an input signal; and
at least one control reference signal;
at least one output for producing an output signal; and
a nonlinear updater that operates as a dynamically configurable element to produce a plurality of different logic gates as selected, the nonlinear updater controlled by both the reference control signal and the input signal, the nonlinear updater electrically coupled to the input and electrically coupled to the output, and configured to apply a nonlinear function to the reference signal and the input signal in response to both the reference control signal and the input signal to produce the output signal representing a logical expression being implemented by one of the plurality of different logic gates on the input signal;

increasing a state value of each element of the array by a value defining a search key that corresponds to a searched-for information item; and updating the state value of each element of the array by performing a nonlinear folding of each state value of each element of the array on a predetermined pivot.

2. The method of claim 1, further comprising determining whether the searched-for information item is encoded on at least one of the elements of the array by determining whether at least one of the elements has a maximum state value after the step of updating.

3. The method of claim 1, wherein the step of encoding comprises determining a resolution for each element of the array.

4. The method of claim 3, wherein the determined resolution r is defined by an equation $$r = \frac{1}{2} \cdot \frac{1}{(I_{max}+1)},$$

wherein $I_{mp}$ is a maximum positive integer.

5. The method of claim 4, wherein the resolution provides mapping on an information item, z, to an irrational number, $x^*_z$, on the interval (0, ½), the mapping defined by an equation $x^*_z = z \cdot r$.

6. A method searching a database, the method comprising:
encoding a plurality of information items on an array of nonlinear dynamical elements such that each element of the array has a threshold value that confines a state of each element on a fixed point and uniquely encodes an information item on each element, wherein the nonlinear dynamical elements includes at least one logic gate for implementing logical expressions, the logic gate comprising:
at least one input for receiving an input signal; and
at least one control reference signal;
at least one output for producing an output signal; and
a nonlinear updater that operates as a dynamically configurable element to produce a plurality of different logic gates as selected, the nonlinear updater controlled by both the reference control signal and the input signal, the nonlinear updater electrically coupled to the input and electrically coupled to the output, and configured to apply a nonlinear function to the reference signal and the input signal in response to both the reference control signal and the input signal to produce the output signal representing a logical expression being implemented by one of the plurality of different logic gates on the input signal;
increasing a state value of each element of the array by a value defining a search key that corresponds to a searched-for information item, the search key, $S_{key}^z$, is defined by an equation $$S_{key}^z = \frac{1}{2} - x^*_z = \frac{1}{2} - z \cdot r,$$

where z is value corresponding to a searched-for information item, $x^*_z$ is an irrational number on an interval (0, ½), and wherein the step of encoding comprises determining a resolution r for each element of the array, the determined resolution r is defined by an equation $$r = \frac{1}{2} \cdot \frac{1}{(I_{max}+1)},$$

wherein $I_{max}$ is a maximum positive integer; and
updating the state value of each element of the array by performing a nonlinear folding of each state value of each element of the array on a predetermined pivot.

7. The method of claim 6, further comprising determining whether the searched-for information item is encoded on at least one of the elements of the array by determining whether at least one of the elements has a maximum state value after the step of updating.

8. The method of claim 6, wherein the step of encoding comprises determining a resolution for each element of the array.

9. The method of claim 8, wherein the determined resolution r is defined by an equation $$r = \frac{1}{2} \cdot \frac{1}{(I_{max}+1)},$$

wherein $I_{max}$ is a maximum positive integer.

10. The method of claim 9, wherein the resolution provides mapping on an information item, z, to an irrational number, $x^*_z$, on the interval (0, ½), the mapping defined by an equation $x^*_z = z \cdot r$.

11. A dynamical search engine for searching a database, the dynamical search engine comprising:
a database comprising an array of nonlinear dynamical elements, a plurality of information items being encoded on the array elements such that each element of the array has a threshold value that confines a state of each element on a fixed point and uniquely encodes an information item, wherein the nonlinear dynamical elements includes at least one logic gate for implementing logical expressions, each element of the array evolves according to a unimodal map of unimodal probability distribution, and the unimodal map is a tent map defined by an equation $x_{n+1} = 2\min(x_n, 1-x_n)$, where each element of the array is denoted by x and n is a number of elements in the array, the logic gate comprising:
at least one input for receiving an input signal; and
at least one control reference signal;
at least one output for producing an output signal; and
a nonlinear updater that operates as a dynamically configurable element to produce a plurality of different logic gates as selected, the nonlinear updater controlled by both the reference control signal and the input signal, the nonlinear updater electrically coupled to the input and electrically coupled to the output, and configured to apply a nonlinear function to the reference signal and the input signal in response to both the reference control signal and the input signal to produce the output signal representing a logical expression being implemented by one of the plurality of different logic gates on the input signal; and a controller for controlling electrical signals supplied to the database, wherein one supplied signal increases a state value of each element of the array by a quantity defining a search key that corresponds to a searched-for information item, and wherein a subsequently supplied signal updates the state value of each element of the array by performing a nonlinear folding of each state value based on a predetermined pivot.

12. The dynamical search engine of claim 11, wherein a global operation causes only dynamical elements of the array containing searched-for information to reach a maximum value in response to the subsequently supplied signal.

13. A dynamical search engine for searching a database, the dynamical search engine comprising:
- a database comprising an array of nonlinear dynamical elements, a plurality of information items being encoded on the array elements such that each element of the array has a threshold value that confines a state of each element on a fixed point and uniquely encodes an information item, wherein the nonlinear dynamical elements includes at least one logic gate for implementing logical expressions, the logic gate comprising:
  - at least one input for receiving an input signal; and
  - at least one control reference signal;
  - at least one output for producing an output signal; and
  - a nonlinear updater that operates as a dynamically configurable element to produce a plurality of different logic gates as selected, the nonlinear updater controlled by both the reference control signal and the input signal, the nonlinear updater electrically coupled to the input and electrically coupled to the output, and configured to apply a nonlinear function to the reference signal and the input signal in response to both the reference control signal and the input signal to produce the output signal representing a logical expression being implemented by one of the plurality of different logic gates on the input signal; and
- a controller for controlling electrical signals supplied to the database, wherein one supplied signal increases a state value of each element of the array by a quantity defining a search key that corresponds to a searched-for information item, the search key, $S_{key}^{z}$, is defined by an equation $$S_{key}^{z} = \frac{1}{2} - x_{z}^{*} = \frac{1}{2} - z \cdot r,$$

where z is value corresponding to a searched-for information item, $x^{*}_{z}$ is an irrational number on an interval (0, ½), and wherein the information encoded in the array includes determining a resolution r for each element of the array, the determined resolution r is defined by an equation $$r = \frac{1}{2} \cdot \frac{1}{(I_{max} + 1)},$$

wherein $I_{max}$ is a maximum positive integer and wherein a subsequently supplied signal updates the state value of each element of the array by performing a nonlinear folding of each state value based on a predetermined pivot.

14. The dynamical search engine of claim 13, wherein a global operation causes only dynamical elements of the array containing searched-for information to reach a maximum value in response to the subsequently supplied signal.

* * * * *

UNITED STATES PATENT AND TRADEMARK OFFICE
CERTIFICATE OF CORRECTION

| | | |
|---|---|---|
| PATENT NO. | : 8,250,055 B2 | Page 1 of 1 |
| APPLICATION NO. | : 12/517959 | |
| DATED | : August 21, 2012 | |
| INVENTOR(S) | : William L. Ditto et al. | |

It is certified that error appears in the above-identified patent and that said Letters Patent is hereby corrected as shown below:

Column 1, line 22, the phrase "may have certain rights" should read --has certain rights--.

Signed and Sealed this
First Day of January, 2013

David J. Kappos
*Director of the United States Patent and Trademark Office*